Patented Oct. 1, 1940

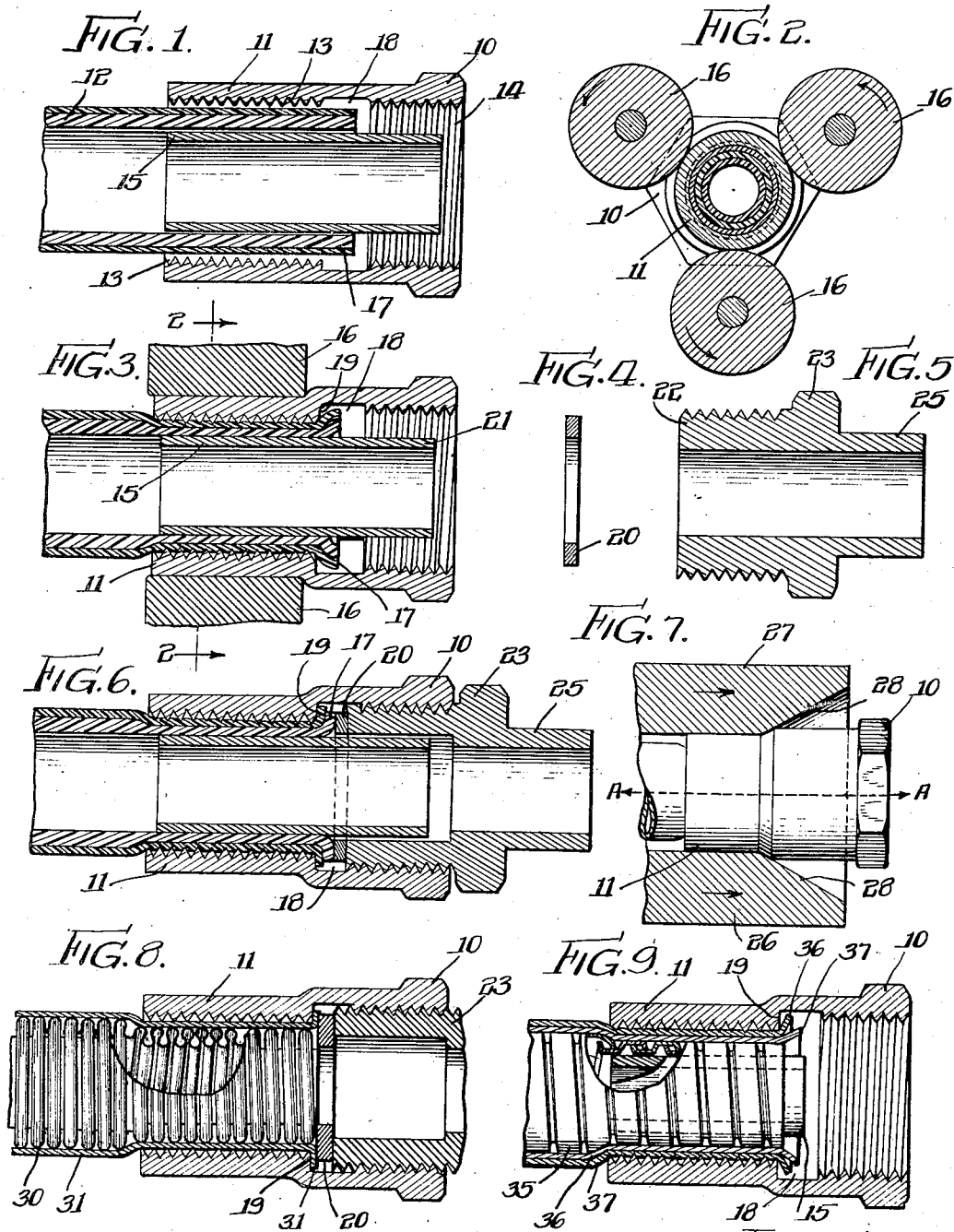

2,216,686

UNITED STATES PATENT OFFICE 2,216,686

COUPLING AND METHOD OF MAKING SAME

James Fentress, Hubbard Woods, Ill., assignor to Chicago Metal Hose Corporation, Maywood, Ill., a corporation of Illinois Application May 7, 1936, Serial No. 78,507

5 Claims. (Cl. 29—88.2)

This invention relates to a new and improved coupling for flexible conduits or hose, and to the method of assembling the coupling upon the hose end. More particularly, the invention relates to that type of coupling which is adapted to be contracted into gripping engagement with the hose body.

It is an object of the invention to produce a coupling for flexible conduits or hose which is constructed of a minimum number of parts and which may be secured upon the hose end with a minimum number of operations, and yet which seals the hose to the coupling in a manner which renders the joint therebetween impervious to the most searching fluids even when subjected to high pressure.

It is a further object to produce a fluid-tight connection for flexible hose in which no welding or soldering of the coupling parts is necessary, and in which no packing is required. The coupling of the present invention may be very readily applied to the hose end, the end being sealed during the application in a manner which insures a permanent, durable, and positive fluid-tight joint.

More specifically it is an object to produce a coupling of the contraction type wherein the operation of contracting the coupling sleeve upon the hose body automatically positions the end of the hose to facilitate the production of a permanent and fluid-tight joint at the hose end as the complementary coupling parts are arranged in assembled relation. In accordance with the invention the coupling body is provided with an annular recess into which the hose end is automatically positioned as the coupling sleeve is contracted about the hose. This automatic positioning of the hose end dispenses with special manipulation of the hose parts and at the same time insures that the end may be gripped and clamped tightly against the coupling body whereby to insure the production of an effective fluid and pressure tight seal.

Other objects and advantages of the invention will be apparent from the following specification when taken in connection with the accompanying drawing wherein certain preferred embodiments are illustrated.

In the drawing, wherein like reference numerals refer to like parts throughout;

Figure 1 is a longitudinal sectional view of the main coupling body showing the hose or flexible conduit as arranged therein prior to the contraction of the coupling sleeve.

Figure 2 is a transverse sectional view taken along the line 2—2 of Figure 3 illustrating one means for contracting the coupling sleeve about the hose body.

Figures 3, 4 and 5 are views illustrating the several coupling parts and the manner of their assembly. Figure 3 is a view similar to Figure 1 illustrating the contracting of the coupling sleeve into gripping engagement with the hose. Figure 4 is a sectional view showing the washer which is adapted to be clamped against the hose end, and Figure 5 is a longitudinal sectional view of the companion coupling member or stud which is adapted to be threaded into the main coupling body.

Figure 6 is a sectional view through the completed coupling.

Figure 7 is a view illustrating an alternate method of contracting the coupling sleeve into gripping engagement wtih the hose.

Figure 8 is a longitudinal sectional view showing the coupling as applied to a modified form of flexible conduit, and Figure 9 is a similar view showing the main coupling body as applied to still another form of compressible conduit or hose.

Referring first to Figures 1 to 6 inclusive, it will be seen that the embodiment of the invention there set forth for purposes of illustration comprises a main coupling metal body 10 having a cylindrical sleeve 11 extending therefrom and into which the end of the hose or flexible conduit 12 is adapted to be loosely inserted as shown in Figure 1. The hose in this instance may be of any suitable material, such for example as rubber, fabric, Cellophane, or the like, with or without metal braid; and it may be of multiple construction, as shown, or of a single thickness wall. It is to be understood that the coupling of the present invention and the method of assembling it are well adapted for use with various types of flexible hose or tubing, including so-called flexible metal hose as will later appear, and are not to be taken as limited to hose of particular materials. The sleeve 11 has formed on its interior surface a series of projections or serrations 13 to facilitate the gripping of the exterior surface of the hose. These projections may conveniently take the form of a series of annular ridges or a continuous helical screw thread, or they may comprise any sort of suitable sharp projections which will bite into the hose body. The coupling body is interiorly threaded as indicated at 14. A cylindrical metallic nipple 15 is adapted to be fitted loosely into the hose end.

In assembling the coupling, after the hose end has been arranged within the sleeve 11 and the nipple 15 in turn arranged within the hose, as shown in Figure 1, the sleeve is contracted into gripping engagement with the exterior surface of the hose. This contracting operation may be conveniently carried out by the means, as illustrated in Figures 2 and 3. As shown, the coupling sleeve is inserted between triangularly disposed metal rolls 16. These rolls are rotated about their respective axes as they are moved relatively toward a common center, the central axis of the coupling, thus contracting the coupling sleeve about the hose and bringing the projections or teeth 13 into tight biting engagement with the exterior hose surface. The extreme end portions 17 of the hose extend into an annular chamber 18 formed interiorly of the coupling adjacent the inner end of the sleeve 11. As the sleeve is contracted about the hose, the unconfined end portions 17 thereof flex radially outwardly, as indicated in Figure 3, into the annular coupling chamber 18. This action takes place automatically as an incident to the sleeve contraction due to the shaping and arrangement of the parts, and it will take place whether the hose is made of a single layer of material or of multiple layers. During the sleeve contraction, a vertical wall 19 is formed in the chamber 18 at the end of the threaded sleeve. The nipple 15 acts to support the hose body as the coupling sleeve 11 is contracted, thus clamping the hose wall tightly between the nipple and the coupling sleeve projections.

After the coupling sleeve has been contracted about the hose, the washer 20, Fig. 4, is fitted over the end 21 of the nipple 15. The threaded end portion 22 of the companion coupling member or coupling stud 23, Fig. 5, is then brought into threaded engagement with the threads 14 of the main coupling body. As the coupling stud is threaded into seated position within the main coupling body, the washer 20 is brought into tight sealing engagement against the end 17 of the hose as illustrated in Figure 6. The hose end by the same operation is also brought into tight sealing engagement against the wall 19 of the annular chamber 18. The hose end is thus secured in a fluid-tight seal between the washer 20 and the wall 19 which will be impervious to the most searching fluids. Where the projections 13 on the inner surface of the coupling sleeve take the form of a series of annular ridges, a series of further seals is produced between the sleeve and the exterior surface of the hose where each annular ridge bites into the hose wall.

It will be noted that the sleeve accordingly provides a hose receiving bore consisting of the axially extended serrated section 13 and the annular coupling chamber 18. This bore in the instant embodiment extends therefore from the inner extremity of the nipple receiving portion 14 to the opposite end of the sleeve. It will be noted that this bore between its two ends is of annular form for receiving the end of a tubular hose and, accordingly, is of generally cylindrical shape as defined in the claims. It will be noted, moreover, that the bore terminates just short of the threaded section 14 which extends beyond the extremity thereof to receive the nipple or mating coupling element for clamping the flared end of the hose subsequent to contraction of the sleeve.

The coupling is thus constructed of a minimum number of parts which may be very readily assembled. It is unnecessary to specially condition or manipulate the hose wall. The hose end is merely inserted into the proper position within the coupling sleeve after which the sleeve is contracted about the hose body. As an incident to this contracting operation, a vertical sealing wall is formed within the annular chamber 18 and the extreme end of the hose is automatically turned outwardly so that when the washer 20 has been inserted into position and the coupling stud 23 threaded into assembled relation, the hose end will be firmly clamped in a sealing position. It is unnecessary to manipulate the extreme hose end after the sleeve is contracted as the end is automatically positioned as an incident to the contracting operation. It is also unnecessary to particularly arrange the hose end with respect to the washer 20 due to the fact that the end has been automatically turned outwardly as the coupling sleeve is contracted. As a result the hose end assumes the proper sealing position with respect to the washer as the latter is brought into clamping position. It is merely necessary to insert the washer into the hose body and thread the coupling stud into position. Not only is the hose end sealed in a fluid-tight joint, but due to the fact that the end is positively clamped between the washer 20 and the wall 19 on the coupling body, a joint is secured which will withstand considerable pressure and which will aid the projections 13 in maintaining the hose in fixed and proper position within the coupling body. There is no thickening of the hose wall, but the end portion thereof is permanently and positively clamped in position in a fluid-tight seal. No welding or soldering is necessary and no packing is required. The joint may be freely disassembled for the purpose of inserting various types of coupling studs. If desired, the projection 25 of the companion coupling member or stud 23 may be screw-threaded to facilitate its connection with a second coupling or the like.

In Figure 7 there is illustrated an alternate means for contracting the coupling sleeve into engagement with the compressible conduit or hose. In this instance a split die composed of two complementary sections 26 and 27 separable along the line A—A is employed. In employing this form of the invention the complementary die sections are brought into engagement around the hose body after the hose end has been arranged within the coupling sleeve as in the first described embodiment of the invention. The die members are then moved axially of the coupling sleeve in the direction of the arrows shown in Figure 7. The die members 26 and 27 have a conical surface 28 formed at their forward ends, and during the axial movement of the die members, this conical surface causes the contraction of the coupling sleeve about the hose. The die members may thereafter be separated and the contracted coupling removed. The washer 20 and the companion coupling stud 23 are then inserted into the coupling body as previously described.

In Figure 8 the coupling of the invention is shown applied to a flexible metal hose or conduit of the corrugated tubing type. As illustrated, the hose in this instance comprises a metal tube 30 corrugated throughout its length. The corrugations may be helical, as illustrated, or annular. The tube 30 is enclosed within a cover member 31 which may include metal braid as well as a fibrous body material. The coupling parts and their manner of assembly are the same as previously described. In this instance it is to be noted that while the cover member 31 will be automatically turned radially outwardly as the coupling sleeve is contracted, whereby it may be firmly clamped between the washer 20 and the wall 19 of the coupling, the metal tube 30 is not turned outwardly, but is compressed into tight engagement with the washer. That is, as the washer is forced into position against the hose end, the corrugated tubing 30 will be compressed axially, and due to its inherent resiliency and strength, will be maintained in tight engagement against the face of the washer. A metal-to-metal seal between the corrugated tubing 30 and the washer is, therefore, provided in addition to the cover member seal. No inner sleeve member corresponding to the nipple 15 in the first described embodiments of the invention is here provided, the strength of the tubing itself being relied upon to insure the maintenance of the tubing wall in position during the contracting of the coupling sleeve.

In Figure 9 the main coupling body is shown in association with still another form of flexible metal tubing. In this instance the tubing is of the spiral-wound type and comprises a spirally-wound metal strip 35 and a covering made up of cover members 36 and 37. The outer cover member 37 may, by way of example, be metal braid and the inner cover member 36 some form of fabric, rubber, Cellophane or the like. In this form of the invention the cover members 36 and 37 will be turned radially outwardly as the coupling sleeve 11 is contracted, whereby to be sealed between the washer and the wall 19 of the coupling as previously described. The spiral-wound metal strip 35 will be brought into tight sealing engagement against the washer as in the case of the tube 30 illustrated in Figure 8. In this instance the inner nipple 15 is employed, but it is shorter than the nipple illustrated in Figure 1, extending only into the annular chamber 18 of the coupling body.

It is obvious that various changes may be made in the specific embodiments of the invention shown for purposes of illustration, and in the several method steps of assembly described. For example, it will be seen that the nipple 15 may be shortened, and in certain instances completely dispensed with if desired. Various means of contracting the coupling sleeve may be employed. The invention is, therefore, not to be limited to the precise embodiments and method steps illustrated and described, but only as indicated in the following claims.

The invention is hereby claimed as follows:

1. The method of making a hose connection which comprises providing a coupling sleeve having a bore of generally cylindrical shape from end to end, inserting a hose into the bore from one end thereof, contracting the sleeve about the hose, from a point removed from the end of the hose toward the hose inserted end of the bore, sufficiently to grip the hose, to form a pronounced shoulder near the end of the hose, and to flare the end of the hose to overlie the shoulder and be in line with the end of a mating coupling element which, when inserted from the other end of the sleeve, and when fully applied, will clamp the flared hose end between the end of said mating element and the said shoulder and form a seal.

2. The method as defined in claim 1 including the step of applying said mating element to the sleeve and gripping the said flared hose between said mating element and the shoulder.

3. The method as defined in claim 1 including the step of inserting and applying a threaded mating element within cooperating threads in the said sleeve to clamp the flared hose end against the said shoulder.

4. The method as defined in claim 1 wherein an inner sleeve is disposed within said hose during the contracting step.

5. The method of making a hose connection which comprises providing a coupling sleeve having a bore of generally cylindrical shape from end to end, inserting a composite flexible conduit comprising an inner metal tube and an outer cover into the bore from one end thereof, contracting the sleeve about the hose from a point removed from the end of the hose toward the hose inserted end of the bore sufficiently to grip the hose, to form a pronounced shoulder near the end of the hose and to flare the end of the said outer cover to overlie the shoulder and be in line with the end of a mating coupling element which, when inserted from the other end of the sleeve and fully applied, will clamp the flared cover end between the end of said mating element and the said shoulder while simultaneously axially against the shoulder and form a seal, and thereafter applying said mating element to clamp the cover end compressing the inner metal tube.

JAMES FENTRESS.

CERTIFICATE OF CORRECTION.

Patent No. 2,216,686.                                              October 1, 1940.

JAMES FENTRESS.

It is hereby certified that error appears in the printed specification of the above numbered patent requiring correction as follows: Page 3, second column, line 45, claim 5, strike out the words "against the shoulder while simultaneously axially" and insert the same after "end" in line 47, same claim; and that the said Letters Patent should be read with this correction therein that the same may conform to the record of the case in the Patent Office.

Signed and sealed this 5th day of November, A. D. 1940.

(Seal)
Henry Van Arsdale,
Acting Commissioner of Patents.